Feb. 18, 1941.  H. W. HILL ET AL  2,232,233
OPHTHALMIC LENS
Filed April 7, 1938
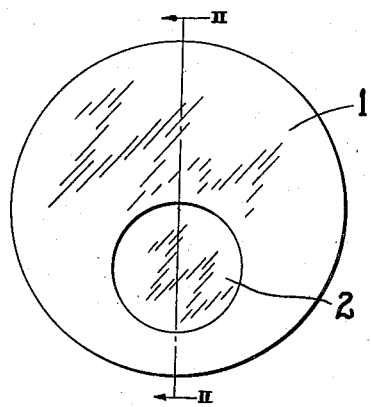
Fig. I
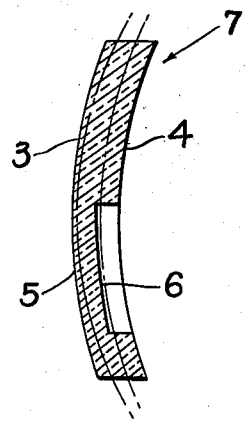
Fig. II
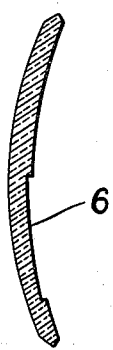
Fig. III
INVENTOR
EDGAR D. TILLYER
HARRY W. HILL
BY
Harry H. Styll
ATTORNEY Patented Feb. 18, 1941

2,232,233

UNITED STATES PATENT OFFICE 2,232,233

OPHTHALMIC LENS

Harry W. Hill and Edgar D. Tillyer, Southbridge, Mass., assignors to American Optical Company, Southbridge, Mass., a voluntary association of Massachusetts Application April 7, 1938, Serial No. 200,702

1 Claim. (Cl. 88—54)

This invention relates to improvements in multifocal and bifocal lenses.

One of the principal objects of the invention is to provide a unitary multifocal lens having any desired prescriptive power in any one of its optical fields, and particularly to have any desired prism or cylindrical power in any one of its fields and to provide an improved, inexpensive and efficient process for producing the same.

Other objects and advantages of the invention will become apparent from the following description taken in connection with the accompanying drawing. It will be apparent that many changes may be made in the details of construction and steps of the processes within the scope of the accompanying claim. I, therefore, do not wish to be limited to the exact details shown and described, as the preferred form only has been shown by way of illustration.

Referring to the drawing:

Fig. I is a front view of a lens blank embodying the invention;

Fig. II is a sectional view taken on line II—II of Fig. I; and

Fig. III is a view similar to Fig. II but of a finished lens embodying the invention.

In the present day multifocal and bifocal lenses, made of one piece of material, it has been found inexpedient and almost impossible to obtain prism and cylinder corrections in either the reading or distance vision fields, and particularly when such correction is desired in the reading field only. It is, therefore, a principal object of the invention to provide a form of multifocal lens that will lend itself to the provision of these corrections in either field or all fields as desired to thus supply a deficiency now existing in the art.

Referring more particularly to the drawing wherein similar reference characters designate corresponding parts throughout, we have shown in Fig. I a lens blank embodying the invention. This lens is made of a single homogenous piece of glass and comprises the distance portion 1 and the near vision or reading portion 2.

The portion 1 has its front surface 3 and its rear surface 4 of any desired curvature necessary to give the desired power to the finished lens. While the lens has been shown as curved or spherical, it may be flat or non-curved, toric, cylindrical, aspherical, or any desired curvature, or it may be prismatic.

The portion 2 may have its front surface 5 and its rear surface 6 of any desired curvature necessary to give the desired correction in the near vision portion.

It will be apparent that by forming the desired curvatures on the portions 5 and 6, and 3 and 4, it will be possible to obtain any desired prism and cylinder powers in either the distance portion 1 or the near vision portion 2, or different corrections in each of the fields. As stated above, this type of correction has been highly desired, but due to the lack of any known process or method of making such a lens, it has not been previously possible to obtain these results.

In the manufacture of the lens embodying the invention, we first take a blank 7, as shown in Fig. II, and by the methods previously known in the art for grinding onepiece bifocal lenses, we grind and polish the inner surface 6 of the reading vision portion to the necessary curvature to give the desired surface power to this portion.

We then grind the necessary powers on the surfaces 3 and 4 of the distance portion 2 to give the desired correction through this portion and through the reading vision portion.

It will be understood that by grinding the reading vision portion 2 with apparatus which has been used in the art in the past for grinding reading vision portions of onepiece bifocals with other than round segments, that a reading vision portion 2 of practically any desired outline or contour may be obtained.

It will be readily apparent that with this form of lens any desired prism or cylinder correction may be obtained in the distance vision portion or in the reading vision portion, or both, or a different cylindrical correction or prismatic correction may be obtained in either portion from that of the other.

It will be noted that the reading vision portion depression 6 may be formed on either the front surface 3 or the rear surface 4 of the lens blank as desired.

The following are two examples of the lens embodying the invention and by means of which the invention will be best understood:

If a finished lens with a +1.00 diopter sphere in the distance portion and a reading vision portion of a +3.00 diopter with a +.50 cylinder is desired, we would first grind on the surface 6 a −4.00 diopter curve. We would then grind the surface 4 with a −6.00 diopter curve in one meridian and a −6.50 diopter curve in the other meridian. Then, using the same axis, we would grind on the front surface 3 a +7.00 diopter curve in one meridian and a +7.50 diopter curve in the opposite meridian. The resultant lens would then be a +1.00 diopter for the distance portion and the reading total would be a +3.00 diopter power with a +.50 diopter cylinder power in the reading portion only.

If it is desired to make a lens with a +1.00 diopter power in the distance vision portion with a +2.00 diopter addition in the reading portion and a 1 degree prism in the reading portion only, we would first grind a −4.00 diopter curve on the surface 6.

We would then grind and polish the surface 4 with a −6.00 diopter curve and then grind and polish on the front surface of the blank a +7.00 diopter curve with a 1 degree prism having its base in the desired direction. The resultant lens would have a +1.00 diopter power in the distance vision portion and a +3.00 diopter power on the reading vision portion with a 1 degree prism on the reading vision portion only with its base in the desired direction.

If it is desired to have different cylinder axis and cylinder powers in the reading and distant fields all that is necessary is to grind the required front curve which, in combination with the reading portion, gives the near prescription, then place on the side that the reading portion is on, a sphero cylinder with the power and at the axis necessary to obtain the correct distance portion computed by the ordinary method of combining oblique sphero cylinder surfaces.

From the above, it will be seen that we have provided simple, efficient and economical means for obtaining all the objects and advantages of the invention, and have provided both a new and improved article for manufacture and a new and improved process for producing the same.

Having described our invention, we claim:

A multifocal ophthalmic lens having a distance vision field and a near vision field, said lens comprising a single piece of lens medium having a depressed area on one side thereof with a spherical bottom surface of finished optical quality entirely surrounded by a cliff like wall with said bottom surface being of a curvature controlled so as to introduce in part the optical characteristics desired in the near vision field and yet be cupped by an amount which will enable the portion of the lens producing the major field to be reduced during the forming of finished optical surfaces on the opposed sides thereof to a usable minimum thickness without grinding into the curve in the bottom of said depressed area, a finished optical sphero-cylindrical surface on the side of the lens opposite the depressed area of a curvature so controlled that when combined with the spherical curvature of the bottom of the depressed area it will introduce a desired sphero-cylindrical power in the near vision field of the lens, said sphero-cylindrical surface being formed to such a depth as to reduce the thickness of the near vision field to a minimum usable thickness and so as to allow an optical surface to be formed on the opposite side of the lens to a depth sufficient to reduce the thickness of the distance vision portion of the lens and the cliff like wall surrounding the near vision field to a desired minimum thickness without grinding into the surface in the bottom of the depressed area and an optical surface of any of the known type in the art on the side of the distance vision portion of the lens having the depressed area therein of such a curvature as to control the resultant focal power of the distance focal field of the lens independently of the power of the near vision field, the thickness of the cliff like wall surrounding the near vision field being initially of a thickness sufficient to permit any of said known optical surfaces to be formed on said side of the lens and said optical surface being formed to such a depth as to reduce the major portion of the lens to a desired minimum thickness and, because of the controlled cupping curvature of the spherical bottom surface of the depressed area, not grind into said surface.

HARRY W. HILL.
EDGAR D. TILLYER.